Sept. 27, 1955  B. M. GORDON ET AL  2,719,226
TIMED SIGNAL GENERATOR
Filed June 4, 1951

KEY
─┤⊂─
ASYMMETRICAL CONDUCTING ELEMENT
(e.g. THERMIONIC OR CRYSTAL DIODE)

FIG. 4  TIME OF LAST TRIGGER

INVENTOR.
BERNARD M. GORDON
HERMAN LUKOFF

George V. Eltgroth
ATTORNEY

United States Patent Office 2,719,226
Patented Sept. 27, 1955

2,719,226

TIMED SIGNAL GENERATOR

Bernard Marshall Gordon and Herman Lukoff, Philadelphia, Pa., assignors, by mesne assignments, to Remington Rand Inc., New York, N. Y., a corporation of Delaware Application June 4, 1951, Serial No. 229,803

6 Claims. (Cl. 250—27)

This invention relates to apparatus for delivering an electric signal after a predetermined time interval and more particularly to such a device in which the timing interval is measured from the last of a series of randomly recurring control signals. It is especially useful as a means for signaling the absence of any signals during time intervals of predetermined length.

There are many applications where an accurately timed electric signal is to be delivered in response to the occurrence of a selected event. Monostable multivibrators have been successfully employed for the development of such timed signals. However, there are other applications in which the time signal is to be delivered after the last of a series of randomly occurring events of selected nature, and monostable multivibrators have been found unsuitable for this purpose, for they fail to establish a new reference from which time is measured with the delivery of successive stimulating impulses to their operating circuit. While mechanical and electromechanical arrangements have been developed, which have the property of establishing a new reference point from which time is measured in response to each new input signal, none of these devices have been sufficiently fast in their operation to meet the requirements of many forms of electronic apparatus.

Accordingly, it is the principal object of the invention to provide new and novel timed signal generating apparatus.

It is another object of the invention to provide electronic timed signal generating apparatus in which the time interval is measured from the last triggering signal.

Figure 1:
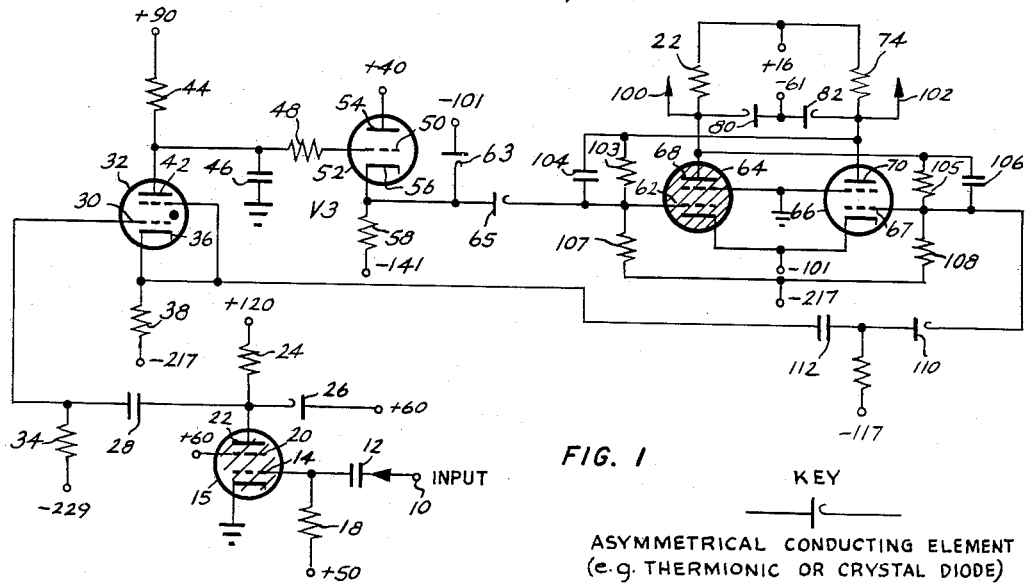
Figure 2:
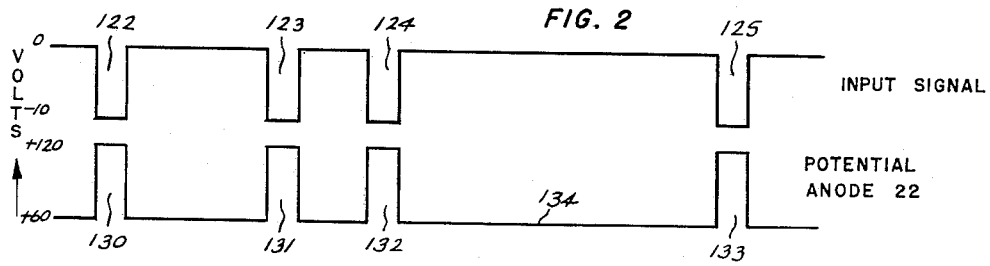
Figure 3:
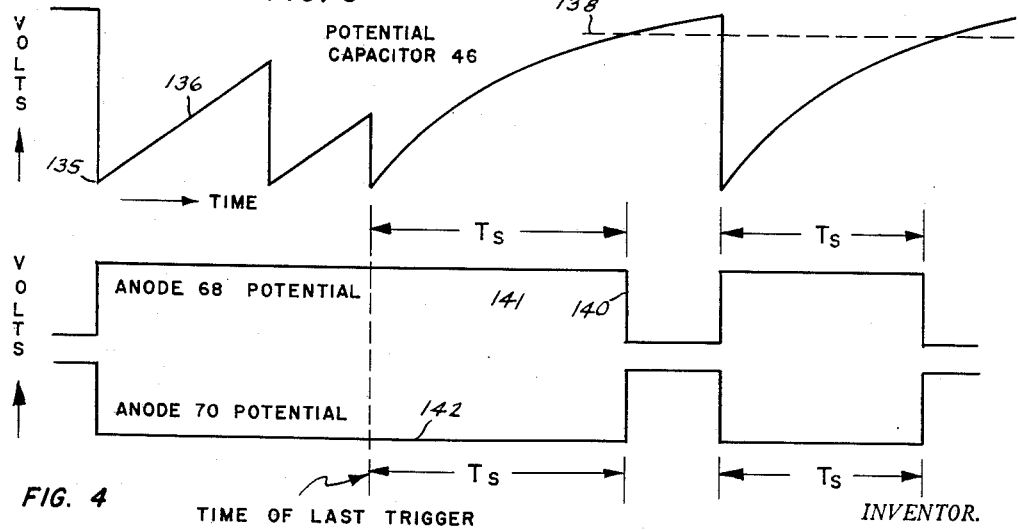

Other objects and advantages of the invention will in part be described and in part be obvious when the specification is read in conjunction with the drawings in which:

Figure 1 is a schematic diagram of apparatus displaying the principles of the invention, Figure 2 is a graphical illustration of input trigger impulses which may be supplied to the apparatus of Figure 1, Figure 3 is a graphical illustration showing the voltage-time variation in the timing portion of the apparatus of Figure 1, while Figure 4 is a voltage-time plot illustrating the nature of the output signals derived from the system.

In the schematic illustration of Figure 1, certain well-known details have been omitted in the interest of simplifying the presentation. The cathodes of all valves are understood to be associated with conventional heater elements energized by any of the well-known heater circuit arrangements. Where operating voltages are indicated, it is to be understood that these may be obtained from any suitable power supply, or supplies, and that all voltage supply points are provided with decoupling networks in accordance with present-day good design practice. For convenient reference, all voltage supply buses bear reference characters corresponding to their operating supply potential. An odd number indicates that the supply bus delivers a negative potential of the indicated magnitude, while positive numbers indicate that the supply bus being dealt with delivers positive potentials of the indicated magnitude. Where specific component values or tube types are indicated, it is to be understood these are illustrative only and that either or both may be varied to suit the needs of a particular application.

The system is operated by negative-going triggering impulses applied to the input terminal 10, coupled by the capacitor 12 to the control grid 14 of the input coupling valve 15. The capacitor 12 may be of the order of 1000 mmfd. The control grid 14 may be coupled with the supply bus 50 through a resistor 18 of about 100,000 ohms. The valve 15 may be of the type commercially designated 25L6, and has a space charge grid 20 supplied from the bus 60. The valve 15 is further provided with an anode 22 connected with the positive supply line 120 through a resistor 24, which may be about 2500 ohms. A clamping diode 26 has its cathode linked to the anode 22 of the valve 15 and its anode connected with the positive supply bus 60. A coupling capacitor 28, which may be about 120 mmfd. connects the anode 22 of the valve 15 to the control grid 30 of a hot cathode thyratron 32. A resistor 34, connected from the control grid 30 to the negative supply line 229, provides a negative bias for the control grid 30. The thyratron or trigger valve 32, which may be of the type commercially designated 2050, is provided with the usual shield grid which may be connected with its cathode 36 returned to the negative supply line 217 through a resistor 38, which may be about 390 ohms. The anode 42 of the thyratron 32 is connected with the positive supply bus 90 through a resistor 44 and is also connected with one of the electrodes of a capacitor 46, whose other electrode is grounded. As is well known, an essential feature of the thyratron operating characteristic is that the grid controls the cathode-anode discharge phenomena only until the thyratron is fired, after which the grid control effectively vanishes.

Potentials appearing across the capacitor 46 are applied, through resistor 48, to the control grid 50 of the triode connected valve 52, whose anode 54 is connected with the positive supply bus 40, and whose cathode 56 is connected with the negative supply line 141 through a resistor 58, which may be of the order of 6800 ohms. A clamping diode 63 is bridged between the cathode 56 of the valve 52 and the negative supply bus 101, the anode of diode 63 being joined to the bus 101. A coupling diode 65 links the cathode 56 of the valve 52 with the control grid 62 of the valve 64, forming a part of the flip-flop made up of cross connected valves 64, 66. The valves 64, 66 may be of the type commercially designated 25L6 and have their cathodes connected together and returned to the negative supply bus 101, while their space charge grids are connected together and linked to ground. The anode 68 of the valve 64 may be connected with the positive supply bus 16 through a resistor 72 at about 2700 ohms, while the anode 70 of the valve 66 may be similarly connected with the positive supply bus 16 through a resistor 74 of like magnitude. A clamping diode 80 has its cathode connected with the anode 68 of the valve 64 and its anode connected with the supply bus 61, while the clamping diode 82 has its cathode linked to the anode 70 of the valve 66 and its anode connected with the said negative supply bus 61. Output lines 100, 102 extend from the anodes 68 and 70, respectively, and may be connected over any suitable coupling circuit to the load device utilizing the timed signals.

A resistor 103, shunted by speed-up capacitor 104, couples the anode 70 of the valve 66 to the control grid 62 of the valve 64, while resistor 105 shunted by speed-up capacitor 106 couples the control grid 67 of the valve 66 with the anode 68 of the valve 64. Resistors 107 and 108, respectively, return the control grids 62, 67 to the negative supply bus 217. With type 25L6 valves employed at the indicated operating potentials a resistance of the order of 10,000 ohms has been found suitable for the resistors 103, 105, while a value of about 14,000 ohms for resistors 107, 108 provides suitable flipping action.

The control grid 67 of the valve 66 is connected through the coupling diode 110 and coupling capacitor 112 with the cathode 36 of the thyratron 32. The junction point between the capacitor 112 and diode 110 is provided with bias by the connection of a resistor 114, which may have a value of about 100,000 ohms, to the negative supply bus 117.

Operation of the circuit of Figure 1 may be most conveniently comprehended by reference to the diagrams in Figures 2, 3, and 4. All the curves in the said figures are drawn on the same time scale. The curve at 121 in Figure 2 represents the input potentials which may be applied to the input terminal 10. The valve 15 is normally conductive, by virtue of the positive bias supplied through the resistor 18, and accordingly its anode is normally at about 60 volts potential. The negative input pulse at 122 in the curve 121 of Figure 2 cuts off the flow of current to the anode 22, whereupon its anode potential rises toward the anode supply potential as apparent at 130 in the lower curve 134 of Figure 2. Successive negative-going input signals appearing at 123, 124, and 125 develop corresponding positive-going surges 131, 132, 133, respectively, at the anode 22 of the valve 15. The positive-going surge 130 at the anode 22 of the valve 15 is transmitted through the capacitor 28 to the control grid 30 of the thyratron 32 to initiate ionization thereof. This discharges the capacitor 46, reducing the potential of its ungrounded electrode to the minimum voltage indicated at 135 in Figure 3. The discharge current surge passing from the capacitor 46 through thyratron 32 develops a positive-going voltage surge across the resistor 38 transmitted through capacitor 112 and diode 110 to the control grid 67 of the valve 66. If the valve 66 is not already conductive, anode current flow is initiated, developing a negative-going signal at the anode 70 transmitted to the control grid 62 of the valve 64, where it is inverted and further transmitted to the control grid 67 to complete the flipping of the flip-flops 64, 66 to the state where the valve 66 is conductive and the valve 64 is nonconductive. If the valve 66 is already conductive when the capacitor 46 is discharged, it will remain conductive.

The capacitor 46 now charges from the supply line 90 through the resistor 44, the voltage thereacross increasing as illustrated by the curve portion 136 in Figure 3. The slope of this portion, which regulates the interval between the last trigger pulse and the delivery of a timed signal, is controlled by regulating the magnitudes of resistance 44 and capacitor 46 in accordance with well-known rules.

The ungrounded electrode of the capacitor 46 was made negative with respect to ground during the discharge of the thyratron valve 32 and cut off the flow of current through the triode valve 52, bringing the cathode 56 to its clamped potential controlled by the supply bus 101 acting through clamping diode 63. As the voltage across capacitor 46 builds up, the potential across the cathode resistor 58 also increases but, before the potential across the capacitor 46 has risen to the threshold of conduction in the coupling diode 65, a second triggering impulse arrives at 123 in Figure 2, producing the positive-going surge 131 at the anode 22 of the valve 15 to initiate another discharge of the capacitor 46, whereupon the time-measuring interval begins anew. Still another triggering impulse 124 discharges the capacitor 46 once again before it has reached a sufficient level to initiate conduction through the coupling diode 65.

However, there is a long interval between triggering impulses 124, 125, permitting the capacitor 46 to charge up to and beyond the voltage level indicated at 138 in Figure 3 which is the conducting threshold for the diode 65. When the capacitor potential reaches the voltage level 138, conduction through the diode 65 is initiated, swinging the control grid 62 of the valve 64 positive to transfer conduction to the left hand side of the flip-flop 64, 66. At this instant, the potential of the anode 68 swings negative, as indicated by the vertical limb 140 of the curve 141 in Figure 4, and remains negative until the appearance of the next triggering impulse 125 which again discharges the capacitor 46, to start the timing process anew. The negative-going excursion of the potential of the anode 68 occurs at an instant fixed by the time required for the voltage across the capacitor 46 to change from its most negative value to the value corresponding to the voltage level 38, this time being governed by well-known laws and relationships. The time interval is measured from the last impulse causing discharge of the capacitor 46. Changes in the potential of the anode 70 in the valve 66 are mirror images of the changes in the potential of the anode 68, and are shown by the curve 142 in Figure 4. A negative-going signal is delivered from the anode 68 over the line 100 at a time interval after the last trigger pulse control led primarily by resistance 44 in capacity 46 and secondarily by the operating potentials applied to the various circuit supply points, while a positive-going signal is delivered over the line 102 from the anode 70 of the valve 66 after the same time interval.

The operating biases applied to the coupling diodes 65 and 110 are such that there is a substantial dead band in the operation of the flip-flop 64, 66, potentials lying within this dead band leaving the flip-flop in its previous state.

There may be applications in which the further refinement of the nature of the signals delivered by this apparatus is unimportant, and in such cases the required timing signals may be derived directly from the cathodes of the coupling diodes 65, 110. Many modifications and variations of the invention, adapted to meet the needs of particular services and environments, but not departing essentially from the spirit of the invention, will be readily apparent to those skilled in the art.

What is claimed is:

1. In combination, an electric network characterized by a plurality of mutually exclusive stable states, an electric storage device, a charging circuit connected in energy supply relationship with said storage device, an electric trigger valve connected in discharging relationship with said storage device, an amplitude discriminatory coupling circuit linking said network and said storage device, and a signal line transmitting control stimuli to said electric valve independently of the state of said electric network.

2. In combination, an electric network characterized by a plurality of mutually exclusive stable states, an electric storage device, a charging circuit connected in energy supply relationship with said storage device, an electric valve connected in discharging relationship with said storage device, a first unilateral conductor operatively linking said storage device and a first connection to said electric network, a second unilateral conductor operatively linking said storage device and a second connection to said electric network, and a signal line transmitting control stimuli to said electric valve independently of the state of said electric network.

3. In a timing signal source, an electric network characterized by a plurality of mutually exclusive stable states, a capacitor, a resistor connecting said capacitor with a source of electric energy, an electric valve having a cathode, an anode and a control electrode, conductors joining said anode and said cathode in charge conveying relationship with said capacitor, a first unilateral conductor operatively linking one of said capacitor electrodes and a first connection to said electric network, a second unilateral conductor operatively linking another portion of the circuit including said electric valve and a second connection to said electric network, and a signal line transmitting control stimuli to said control electrode independently of the state of said electric network.

4. In a timing signal source, an electric network characterized by a plurality of mutually exclusive stable states, a capacitor, a resistor connecting said capacitor with a source of electric energy, a first electric valve having a cathode, an anode and a control electrode, conductors joining said first anode and said first cathode in charge conveying relationship with said capacitor, a second electric valve having a cathode, a control electrode and an anode, an electric coupling member linking one of said capacitor electrodes and the control electrode of said second valve, means connecting said second cathode with a relatively negative potential, a connection exciting said second anode from a source of relatively positive potential, a first unilateral conductor operatively linking the cathode-anode circuit of said first valve and a first connection to said electric network, a second unilateral conductor operatively linking the cathode anode circuit of said second valve and a second connection to said electric network, and a signal line transmitting control stimuli to said first electric valve independently of the state of said electric network.

5. In a signal responsive device, an electric network characterized by a plurality of mutually exclusive stable states, a capacitor, a resistor connecting said capacitor with a source of electric energy, a first electric valve having a cathode, an anode and a control electrode, conductors joining said anode and said cathode in charge conveying relationship with said capacitor, a second electric valve having a cathode, a control electrode and an anode, an electric coupling member discriminating against the transmission of high frequency energy linking one of said capacitor electrodes and the control electrode of said second valve, an impedance connecting said second cathode with a relatively negative potential, a connection exciting said second anode from a source of relatively positive potential, a first unilateral conductor operatively linking the cathode end of said impedance and a first connection to said electric network, a second unilateral conductor operatively linking the cathode of said first electric valve and a second connection to said electric network, a signal line delivering signals to the input electrode of a normally conductive third electric valve, and a coupling member delivering signals from the output of said third valve to the control electrode of said first electric valve.

6. In combination, an electric storage device a first electric valve a signal input line transmitting control stimuli to said first electric valve, means connecting said first electric valve in a discharge effecting relationship with said electric storage device, a flip-flop circuit comprising two valves, unilateral devices separately connecting the control members of the two valves of said flip-flop with the circuit including said electric storage device, whereby said flip-flop circuit is restored to a reference condition only if no control stimuli are received through said signal input line during time intervals of predetermined length.

References Cited in the file of this patent
UNITED STATES PATENTS

| | | |
|---|---|---|
| 2,399,668 | Francis | May 7, 1946 |
| 2,421,022 | Francis | May 27, 1947 |
| 2,536,032 | Clark | Jan. 2, 1951 |
| 2,560,124 | Mofenson | July 10, 1951 |
| 2,564,824 | White | Aug. 21, 1951 |
| 2,589,465 | Weiner | Mar. 18, 1952 |
| 2,592,611 | Simon et al. | Apr. 15, 1952 |